United States Patent [19]
Lee et al.

[11] Patent Number: 5,633,884
[45] Date of Patent: May 27, 1997

[54] SELF-SEEDING METHOD AND APPARATUS FOR DUAL CAVITY TYPE TUNABLE LASER UTILIZING DIFFRACTION GRATING

[75] Inventors: Jong-Min Lee; Byung-Heon Cha; Sung-Ho Kim; Do-Kyeong Ko, all of Daejeon-Si, Rep. of Korea

[73] Assignees: Korea Atomic Energy Research Institute, Daejeon-si; Korea Electric Power Corporation, Seoul, both of Rep. of Korea

[21] Appl. No.: 396,642

[22] Filed: Mar. 1, 1995

[30] Foreign Application Priority Data

Nov. 15, 1994 [KR] Rep. of Korea .............. 94-29936

[51] Int. Cl.$^6$ ............................. H01S 3/10
[52] U.S. Cl. ............................. 372/20; 372/102
[58] Field of Search ........................... 372/20, 102

[56] References Cited

U.S. PATENT DOCUMENTS 5,230,005   7/1993   Rubino et al. .............. 372/102

OTHER PUBLICATIONS

"Optics Letters" vol. 20, No. 7, Apr. 1, 1995, Published New York, U.S.

Primary Examiner—Rodney N. Bovernick
Assistant Examiner—Robert E. Wise
Attorney, Agent, or Firm—Nikaido, Marmelstein, Murray & Oram LLP

[57] ABSTRACT

Self-seeding method and apparatus for a dual cavity type tunable laser utilizing a diffraction grating are disclosed, in which first diffracted beams and 0th diffracted beams are utilized. The self-seeding method and apparatus for a dual cavity type tunable laser are constituted such that two oscillators are internally provided by utilizing a diffraction grating and by making a single medium shared, so that the respective oscillators would serve as a master oscillator and a slave oscillator, thereby making it possible to save optical devices. Further, in the present invention, only one partially reflecting mirror is disposed on the output portion of a GIM (grazing incidence with tuning mirror) type oscillator, so that a self-seeding would occur, and that the laser output would be greatly amplified with the oscillation linewidth maintained without variations.

2 Claims, 3 Drawing Sheets

SELF-SEEDING METHOD AND APPARATUS FOR DUAL CAVITY TYPE TUNABLE LASER UTILIZING DIFFRACTION GRATING

FIELD OF THE INVENTION

The present invention relates to self-seeding method and apparatus for a dual cavity type tunable laser utilizing a diffraction grating, in which first diffracted beams and 0th diffracted beams are utilized.

BACKGROUND OF THE INVENTION

Generally, the seeding method in a tunable laser is constituted such that a master oscillator and a slave oscillator are respectively provided with separate gain media. This method has the problem that the gain media have to be separately provided, and many optical elements have to be used.

SUMMARY OF THE INVENTION

The present invention is intended to overcome the above described disadvantages of the conventional techniques.

Therefore it is the object of the present invention to provide self-seeding method and apparatus for a dual cavity type tunable laser in which two oscillators are internally provided by utilizing a diffraction grating and by making a single medium shared, so that the respective oscillators would serve as a master oscillator and a slave oscillator, thereby making it possible to save optical devices. Further, in the present invention, only one partially reflecting mirror is disposed on the output portion of a GIM (grazing incidence with tuning mirror) type oscillator, so that a self-seeding would occur, and that the laser output would be greatly amplified with the oscillation linewidth maintained without variations.

In achieving the above object, the method of the present invention is characterized in that a partially reflecting mirror is installed on the output terminal of the GIM type cavity of a tunable laser so as to form a dual cavity, thereby carrying out a self-seeding. The apparatus of the present invention includes: a laser gain medium 2 installed in front of a wholly reflecting mirror 1; a diffraction grating 3 and tuning mirror 4 installed in front thereof; and a partially reflecting mirror 5 installed in front thereof, whereby a part of the laser output beams is reflected, and thus, 0th diffracted beams and first diffracted beams are all utilized in the diffraction grating.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
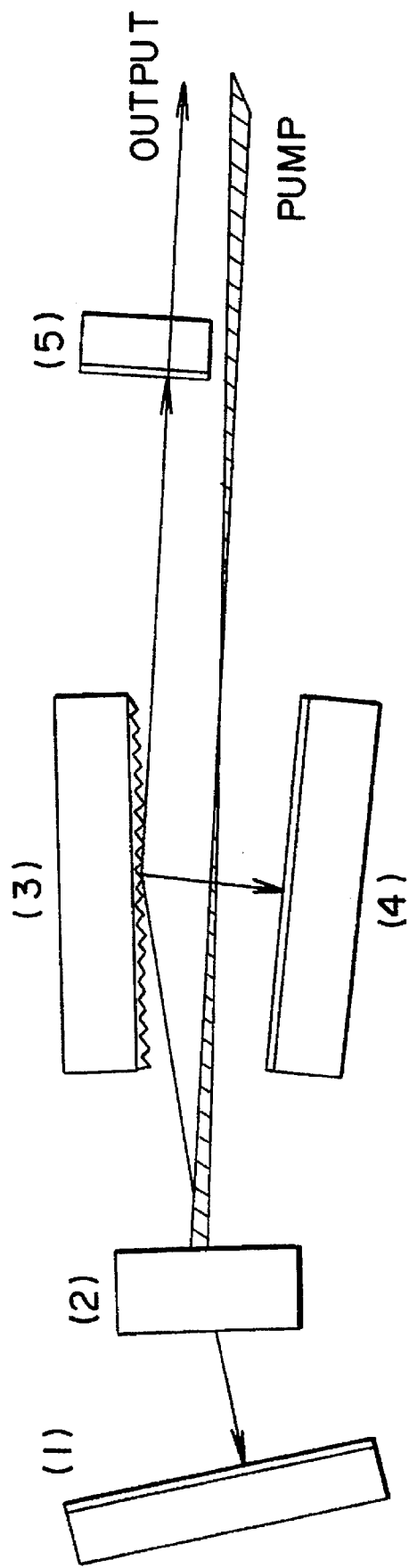
FIG. 1 is a schematic view of the self-seeding apparatus of a dual cavity type tunable laser utilizing a diffraction grating.

FIG. 1 is a schematic view of the serf-seeding apparatus of a dual cavity type tunable laser utilizing a diffraction grating. In this apparatus, a partially reflecting mirror is inserted into the output portion of the cavity of a GIM type tunable laser. If this is disassembled, it becomes two oscillators as shown in FIG. 2.

Figure 2A:
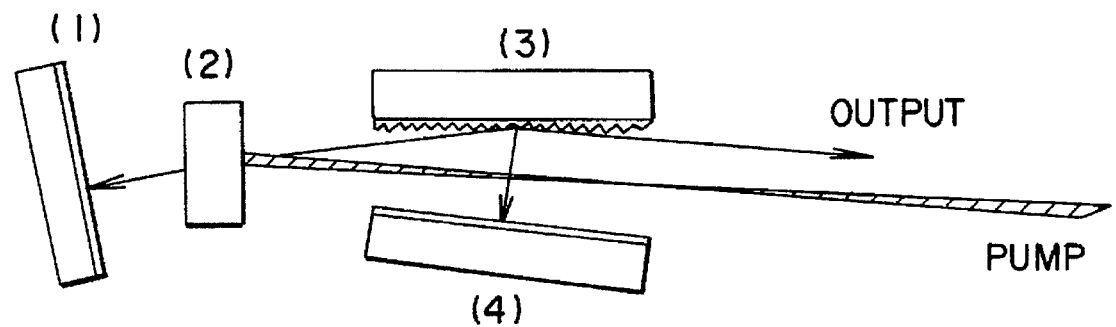
FIG. 2A is a schematic view showing that a dual cavity is disassembled into a GIM type cavity.

FIG. 2A illustrates the GIM type cavity, and in this case, it serves as a master oscillator. In the master oscillator, the beams which have been diffracted by a diffraction grating are reflected again by a tunable mirror to be returned, so that laser oscillations would be realized. The oscillation wavelength can be varied by rotating the tunable mirror.

Figure 2B:
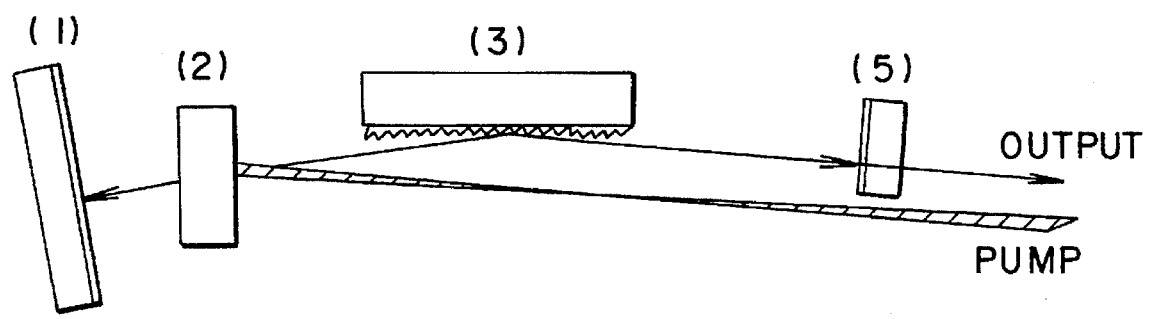
FIG. 2B is a schematic view showing that a dual cavity is disassembled into a standing wave cavity.

Referring to FIG. 2B, a kind of standing wave cavity is illustrated, and beams which have been subjected to 0th diffraction by the diffraction grating form a cavity owing to the wholly reflecting mirror and the partially reflecting mirror. The beams which have been subjected to the 0th diffraction are not selected, and therefore, the oscillation is carried out with a large oscillation region. When an optical pumping is done into the laser gain medium, laser oscillations become possible both in the GIM type cavity and in the standing wave cavity. However, in the GIM type cavity, the oscillations are carried out with a narrow linewidth (a single longitudinal mode is also possible). Generally the laser buildup time is faster than that of the standing wave cavity, and therefore, the laser beams which have been oscillated by the GIM type cavity enter into the standing wave cavity to be amplified by it. In this case, in the standing wave cavity, only the wavelength same as that of the GIM type cavity is amplified. Further, if the wavelength of the GIM type cavity is varied, then the wavelength of the laser beams which have passed through the standing wave cavity are also varied. Therefore, the wavelength of the standing wave cavity is determined by the master oscillator, and therefore, the standing wave cavity is called slave oscillator.

FIG. 3 illustrates the output spectrum under the respective conditions.

Figure 3A:
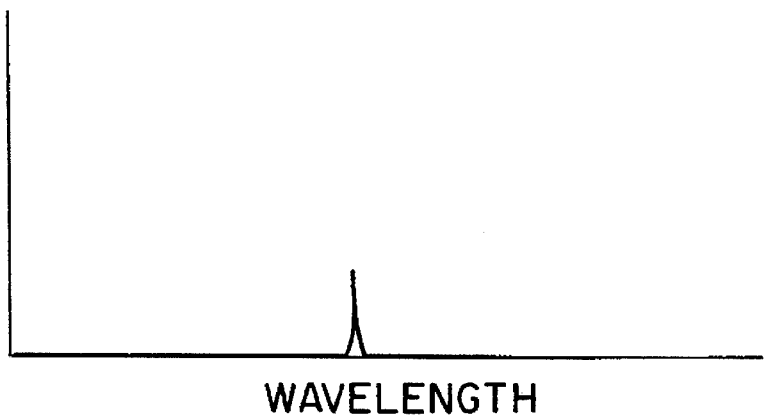
FIG. 3A illustrates the output spectrum of the GIM type cavity.
Figure 3B:
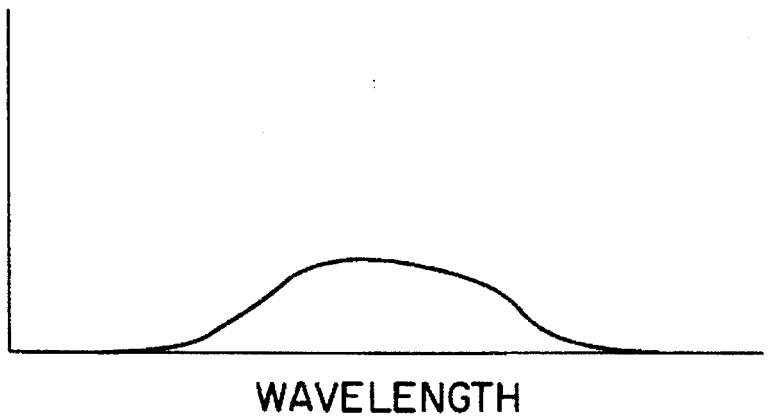
FIG. 3B illustrates the output spectrum of the standing wave cavity.
Figure 3C:
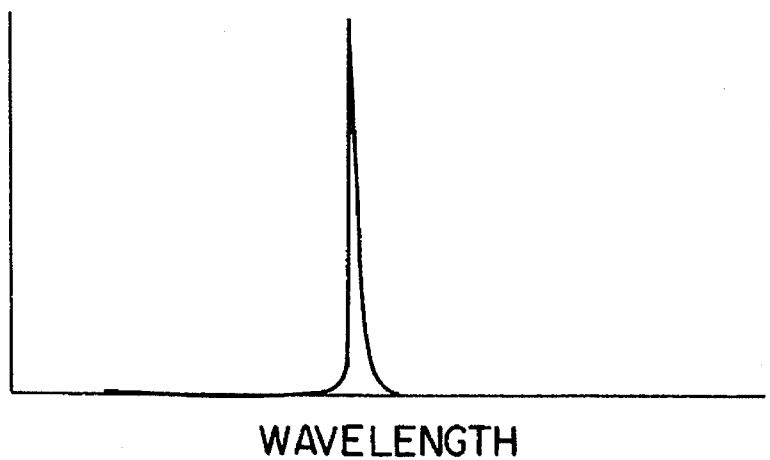
FIG. 3C illustrates the output spectrum outputted when the self-seeding is realized.

That is, when laser beams of the master oscillator having an output spectrum of FIG. 3A enter into the slave oscillator, even if the slave oscillator had an output spectrum of FIG. 3B, the output spectrum of the master oscillator as shown in FIG. 3C is oscillated with only the intensity of the laser beams amplified.

In the present invention constituted as described above, a single medium is shared, and two cavities are internally provided by utilizing a diffraction grating, so that the two cavities would serve as the master oscillator and the slave oscillator respectively. Consequently, the gain medium and various optical devices can be saved. Further, the present invention provides a seeding method in which a single gain medium is used, and therefore, it corresponds to a self-seeding method. Further, only one partially reflecting mirror is installed on the output portion of the GIM type cavity, so that a self-seeding would occur, and that the laser output would be greatly amplified with the oscillation line width maintained intact. Therefore, this method is expected to be applied to the practical use in the field of the laser industry.

What is claimed is:

1. A self-seeding method for a dual cavity type tunable laser utilizing a diffraction grating, comprising: installing a diffraction grating in front of a wholly reflecting mirror; and feeding a 0th and first diffracted beams of the diffraction grating and a laser gain medium with a partially reflecting mirror and a tuning mirror so as to form a dual cavity, thereby carrying out a self-seeding.

2. A self-seeding apparatus for a dual cavity type tunable laser utilizing a diffraction grating, comprising:

a laser gain medium 2 installed in front of a wholly reflecting mirror 1;

a diffraction grating 3 and tuning mirror 4 installed in front thereof; and a partially reflecting mirror 5 installed in front thereof, whereby a part of the laser output beams is reflected, and thus, 0th diffracted beams and first diffracted beams are all utilized in the diffraction grating.

* * * * *